Dec. 26, 1933.   E. L. BOWLES   1,941,384
ELECTRICAL SYSTEM
Filed Jan. 22, 1927

Inventor
Edward L. Bowles
by David Rines
Attorney

Patented Dec. 26, 1933

1,941,384

UNITED STATES PATENT OFFICE 1,941,384

ELECTRICAL SYSTEM

Edward L. Bowles, Watertown, Mass.

Application January 22, 1927. Serial No. 162,748

2 Claims. (Cl. 250—27)

The present invention relates to electrical systems and methods, and more particularly, to systems and methods for filtering out alternating currents, so as to leave pure direct currents. From a more limited aspect, the invention relates to rectifying systems and methods.

Rectified alternating currents, as is well-known, are usually attended with residual amounts, or "ripples", of unrectified current. In many cases, these are not harmful. When applied to other uses, however, they are exceedingly troublesome. It is possible to reduce these ripples, by present and well-known methods of design, to as low a value as desired; but such designs are not, in practice, very economical. The result is that these ripples are nearly always present in commercial work.

An object of the present invention, therefore, is to improve upon present-day electrical systems and methods of the above-described character, to the end that their efficiency may be enhanced and their economy increased.

With the above and other objects in view, as will be hereinafter explained, a feature of the invention resides in the use of a Wheatstone bridge. The combined alternating and direct currents enter the bridge by way of two opposite vertexes, and the other two opposite vertexes of the bridge are so chosen that a zero alternating potential shall exist between them. Direct current only, therefore, will leave the bridge by way of these two other vertexes. In the specific embodiment of the invention that is hereinafter illustrated and described, the direct current is prevented from entering two opposite arms of the bridge by the use of condensers.

Figure 1:
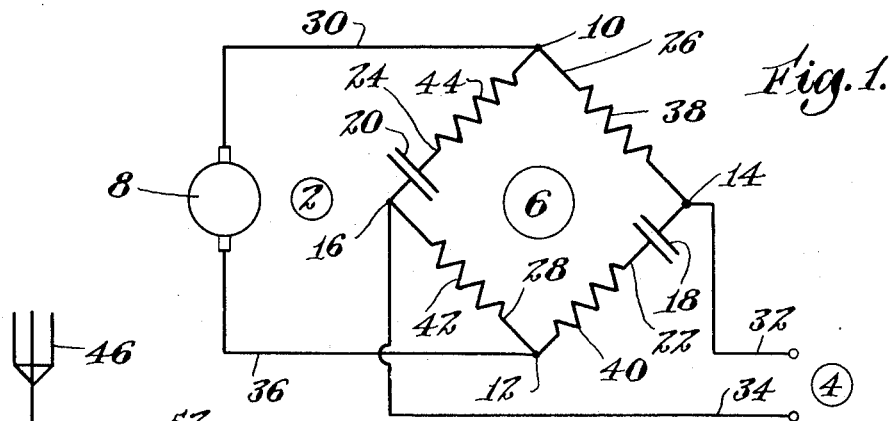
Figure 2:
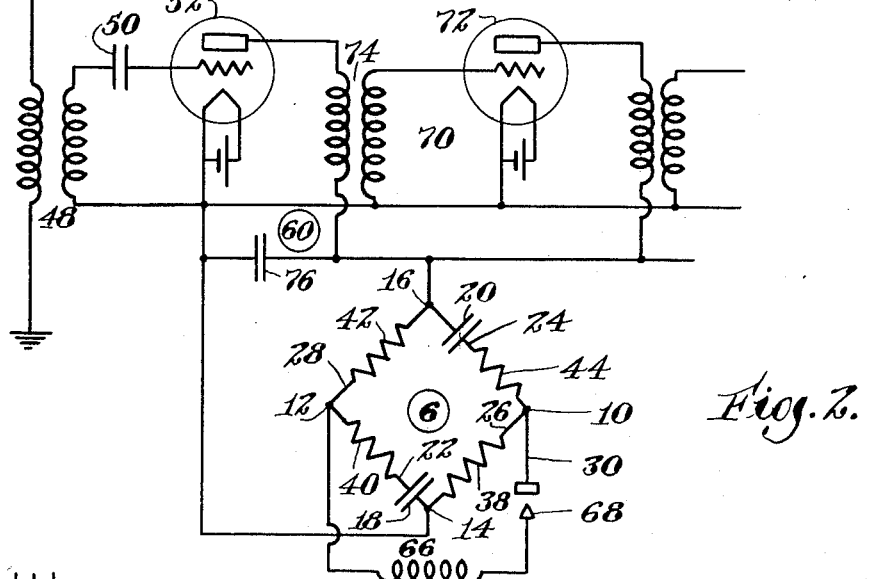
Figure 3:
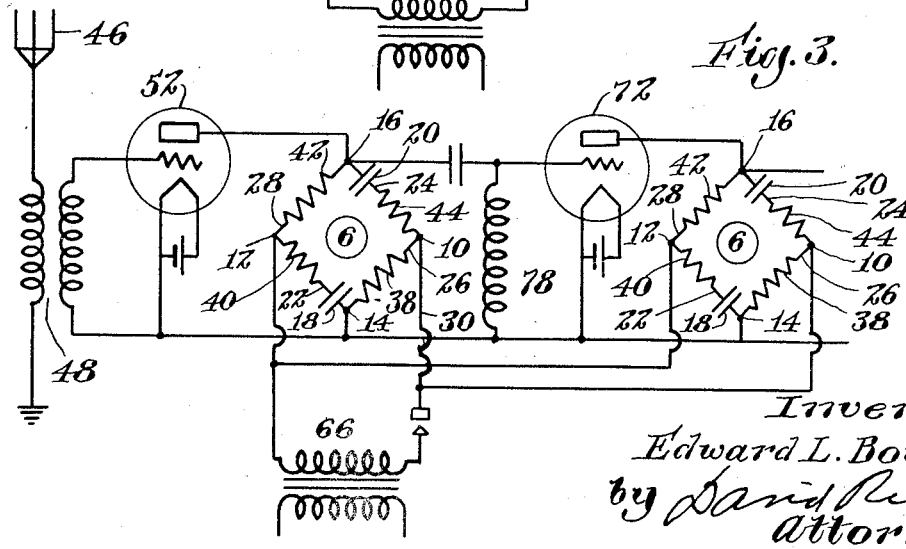

The invention will now be described in connection with the accompanying drawing, in which Fig. 1 is a diagrammatic view illustrating the principle of the invention, and Figs. 2 and 3 are similar views showing the invention applied to radio-receiving systems.

The present invention is applicable wherever it is desired to separate out, or filter, alternating currents from a mixture of alternating and direct currents. Let it be assumed, in Fig. 1, that such a mixture of currents is flowing in the circuit 2. Then, according to the present invention, a second circuit 4 will be provided in which the direct currents only from the circuit 2 will be transmitted. This result will be attained by the use of a Wheatstone-bridge arrangement 6, as will presently be described.

To fix the ideas, a direct-current, commutator generator, 8, is shown, supplying the circuit 2 with direct current. As is well known, the direct current thus supplied is accompanied by alternating-current, commutator ripples; and it is these ripples that will be eliminated from the current flowing in the circuit 4.

Two of the electrical vertexes, 10 and 12, of the Wheatstone bridge are shown connected into the circuit 2. The other two electrical vertexes, 14 and 16, of the bridge, are connected into the circuit 4. Owing to the presence of the alternating current in the circuit 2, there is a difference of alternating potential between the vertexes 10 and 12; but the vertexes 14 and 16 may be so related, by proper adjustment of the impedances of the bridge arms, that there shall be no difference of alternating potential between them. The direct current only of the circuit 2, will, therefore, travel into the circuit 4 by way of the vertexes 14 and 16, and the alternating current will be entirely suppressed from the circuit.

If, now, condensers 18 and 20 are inserted in opposite arms 22 and 24 of the bridge, the direct current will be constrained to travel along the other arms 26 and 28 only. Thus, the direct current will travel from the generator 8, by the conductor 30 of the circuit 2, to the vertex 10, then by the arm 26 of the Wheatstone bridge to the bridge vertex 14, and thence into the conductor 32 of the circuit 4. From the conductor 32, the direct current,—freed now from the alternating current,—will travel to any desired load, after which it will return, by the conductor 34, to the bridge vertex 16, and thence, by the arm 28 and the conductor 36 of the circuit 2, back to the generator 8.

It will be understood, of course, that the Wheatstone bridge must be so designed as to suppress the alternating voltage, but to permit free passage for the direct current. To this end, the arms of the bridge are supplied with impedances 38, 40, 42 and 44. The condensers 18 and 20 may be regarded as part of the impedances 40 and 44; but as their purpose is merely to prevent passage of direct current along the arms 22 and 24, it is preferred to disregard them in the discussion and, therefore, to have their reactances quite small or negligible with respect to the impedances 40 and 44. Now, the impedances of the bridge may be balanced at one frequency and unbalanced at another, which would mean that alternating currents of only a particular frequency or frequencies would be balanced out by this arrangement. If, however, the four reactances of the bridge are all inductors of the same nature, and bear the proper relationships to "balance" such a bridge, the bridge will be balanced for all frequencies.

One of the many applications of the invention is illustrated in connection with the receiving circuit of Fig. 2. Energy received by an antenna 46 is transmitted through a transformer 48 into the input circuit 50 of a space-current device 52, and from the input circuit, into the output or load circuit 60. The output circuit must have a source of direct current. Batteries are customarily used for such purpose. It will not do to have even comparatively slight alternating-current ripples with this direct current, for the space-current device will amplify these ripples, and thus produce an objectionable extraneous sound in the reproducer or loud speaker.

Alternating-current sources of energy are usually more convenient than batteries, and may readily be used according to the present invention. The alternating-current energy from any source 62 may be transmitted through a transformer 64 into a circuit 66 to which the vertexes 10 and 12 of the Wheatstone bridge may be connected. A rectifier 68 may be used to rectify this alternating current and the bridge will eliminate the residual ripples. The resulting direct current may be supplied into the output circuit by connecting it with the vertexes 14 and 16 of the bridge.

It is sometimes desirable to cause the Wheatstone bridge circuit to have no effect on the external plate circuit impedance of the tube 52. This can be accomplished by the insertion of the by-pass condenser 76 which has an impedance negligible compared with the impedance as measured between the vertexes 14 and 16 of the bridge. This condenser in no way affects the operation of the Wheatstone bridge circuit.

The energy from the output circuit 60 may, if desired, be transmitted to the input circuit 70 of a second space-current device 72 that may be coupled to the space-current device 52, inductively, for example, as by means of a transformer 74. In fact, any desired number of space-current devices may be so connected. The condenser 76 is connected so as to serve the same function for all the output circuits. A single Wheatstone bridge may thus be employed as a source of plate voltage for any number of space-current devices.

Individual Wheatstone bridges may, however, be introduced in each plate circuit, as shown in Fig. 3. Any alternating signal voltage applied to the vertexes 14 and 16 of each balanced Wheatstone bridge will produce zero potential differences between the vertexes 10 and 12 of each bridge. The vertexes 10 and 12 may therefore all be connected in parallel to the same rectifying circuit 66 without in any way causing a coupling among the individual plate circuits. These individual Wheatstone bridges act simultaneously, however, as coupling impedances between the output circuit of any particular tube and the input circuit of the succeeding tube. In this manner, the output circuits of the tubes are rendered mutually exclusive and can not be coupled together due to any impedance in the power source or power-supply leads. An impedance 78 serves to prevent blocking of the space-charge device 72 through the accumulation of a negative charge on the grid 80.

Modifications will occur to persons skilled in the art, and all such are considered to fall within the spirit and scope of the invention, as defined in the appended claims.

What is claimed is:

1. An electric system having, in combination, an electric circuit, a plurality of Wheatstone bridges two opposite vertexes of each of which are connected with the electric circuit, and a plurality of space-current devices each having an input circuit and an output circuit, the output circuit of each of the space-current devices being connected with the other two opposite vertexes of a separate Wheatstone bridge, and the Wheatstone bridges serving to couple the output circuit of one space-current device with the input circuit of another space-current device.

2. An electric system having, in combination, a plurality of space-current devices each having an input circuit and an output circuit and connected together in cascade, with a common power source for the output circuits, and Wheatstone-bridge means for connecting the output circuit of one space-current device with the input circuit of another space-current device to prevent coupling of the output circuits of the said two space-current devices.

EDWARD L. BOWLES.